3,847,841
THIOSEMICARBAZIDO HEAVY METAL
ADSORBING RESINS
Kensuke Motani, Akihiko Nakahara, and Nobuyuki Kuramoto, Tokuyama, Japan, assignors to Tokuyama Soda Kabushiki Kaisha, Yamaguchi-ken, Japan
No Drawing. Filed Mar. 7, 1973, Ser. No. 339,382
Claims priority, application Japan, Mar. 11, 1972,
47/24,424, 47/24,425, 47/24,426, 47/24,427
Int. Cl. C08f 27/06, 27/08
U.S. Cl. 260—2.2 R
2 Claims

ABSTRACT OF THE DISCLOSURE

A heavy metal adsorbing resin of which the main polymer chain consists of an aliphatic hydrocarbon skeleton and which contains at least one functional group selected from amino, polyalkylene polyamino, hydrazido, thioureido, thiosemicarbazido, isothiocyanato, thiobiuret, N-thioaminobiuret, and N-thiocarbamoyl-polyalkylene amino groups. Heavy metals can be removed from a solution containing them by contacting the solution with the above heavy metal adsorbing resin. The resin has a markedly high rate of adsorbing the heavy metals, and can be easily regenerated with a mineral acid or sodium sulfide. The suitable time of regenerating or replacing the resin can be detected by its color change upon adsorption of the heavy metals.

---

This invention relates to a resin having the property of adsorbing heavy metals. More specifically, it relates to a heavy metal adsorbing resin of which the main chain consists of an aliphatic hydrocarbon skeleton and which contains at least one functional group selected from the group consisting of amino, polyalkylene polyamino, hydrazido, thioureido, thiosemicarbazido, isothiocyanato, thiobiuret, N-thioaminobiuret and N-thiocarbamoyl-polyalkylene amino groups.

Methods have previously been known to remove heavy metals such as mercury from a solution containing them by causing an anion exchange resin to adsorb them. However, these methods are commercially infeasible because of the defect that not only the exchange resin has poor ability to adsorb heavy metals, but also the solution treated still contains large quantities of the heavy metals.

In recent years, methods have been proposed to adsorb heavy metals using a chelate resin, but almost all of them have not proved satisfactory for industrial application. For example, a condensation-type chelate resin obtained by reacting thiourea, resorcinol and formaldehyde is considered best suited for use in such a method. However, the condensation-type chelate resin has the defect that its ability to adsorb heavy metals is not entirely satisfactory, its mechanical strength is poor, and it is difficult to regenerate with acid after adsorption of heavy metals.

Accordingly, heavy metal adsorbing resins of better quality have been desired in the art.

An object of this invention is to provide a resin which has a high ability to adsorb heavy metals and high mechanical strength, and which can be easily regenerated.

Another object of this invention is to provide a resin which distinctly discolors upon adsorption of heavy metals.

The other objects and the advantages of this invention will become apparent from the following description.

According to this invention, there is provided a heavy metal adsorbing resin of which the main chain consists of an aliphatic hydrocarbon skeleton and which contains at least one functional group selected from the group consisting of amino, polyalkylene polyamino, hydrazido, thioureido, thiosemicarbazido, thiocyanato, thiobiuret, N-thioaminobiuret, and N - thiocarbamoyl - polyalkylene amino groups.

The heavy metal adsorbing resin of this invention has a markedly high speed of adsorption of heavy metals as compared with the conventional chelate resins, and can adsorb heavy metals almost completely from a solution containing them in low concentrations. Accordingly, when the heavy metals adsorbing resin is contacted with a solution containing heavy metals, the treated solution has very low concentrations of the heavy metals, and the concentrations are constant until the resin has adsorbed the heavy metals and almost reached saturation. Such a characteristic of the heavy metal adsorbing resin of this invention is quite different from that of the conventional condensation-type chelate resin whose adsorbing ability decreases with the passage of the time of contact with heavy metal containing solutions, resulting in a gradual increase in the concentrations of the heavy metals remaining in the solutions after contact.

Since the resin of this invention exhibits a clear discoloration upon adsorption of heavy metals, it serves to determine whether the adsorbing ability of the resin has reached saturation. Therefore, one can easily see when the resin of this invention should be regenerated or replaced, and this adds to the commercial advantage of the resin in accordance with the present invention. The resin of this invention can also be used as an expedient for detecting the presence of heavy metals in waste water. The heavy metal adsorbing resin also lends itself to easy handling because of its superior mechanical strength, and is scarcely broken during its regeneration or scarcely lost during its production by granulation. This is, of course, economically advantageous.

The heavy metal adsorbing resin has the advantage of being able to be regenerated by treatment with an acid after the adsorption of heavy metals to regain its adsorbing ability.

The various advantages of the resin over the conventional chelate resins cannot be ascribed to any clear cause. However, we assume that such advantages are ascribable to the fact that the main chain of the resin consists of an aliphatic hydrocarbon skeleton (the so-called polymerized type high-molecular-weight polymer) and the specific functional group bonded thereto synergistically acts to provide a chelating adsorbing power or other adsorbing power.

The base of the heavy metal adsorbing resin of this invention may be any of which the main chain consists of a polymerized-type high-molecular-weight polymer having a carbon-to-carbon bond and may be a known homopolymer, copolymer or graft copolymer. Typical examples of such polymers that can be suitably used include polymers of olefins such as polyethylene, polypropylene, polybutene, polybutadiene or polyisoprene and copolymers of olefins; copolymers of olefins with other copolymerizable monomers such as vinyl chloride, vinylidene chloride, an acrylic acid ester or a methacrylic acid ester; polymers of unsaturated aliphatic halogenated hydrocarbons such as vinyl chloride, vinylidene chloride, vinylidene chloride or chloroprene; copolymers of the aforesaid unsaturated aliphatic halogenated hydrocarbons with other copolymerizable monomers such as an olefin, vinyl ester, vinyl ether, acrylonitrile, acrylic acid ester or methacrylic acid ester; polymers of acrylonitrile, acrylic acid esters or methacrylic acid esters; polymers of styrene or styrene derivatives; copolymers of the aforesaid styrene monomers with other copolymerizable monomers such as acrylonitrile or a methacrylic acid ester; and graft copolymers obtained by grafting the aforementioned monomers to rubbery substances such as a polyalkylene oxide, polybutadiene, ethylene/propylene copolymer or ethylene/propylene/diene terpolymer. Especially when a polymer, copolymer or graft copolymer of the unsaturated aliphatic halogenated hydrocarbon is used as the resin base, the introduction of the functional group is easy, and the resulting heavy metal adsorbing resin exhibits very superior advantages.

It is essential in the present invention that the main chain of the metal adsorbing resin consists of the aliphatic hydrocarbon skeleton, and at least one functional group selected from amino, polyalkylene polyamino, hydrazido, thioureido, thiosemicarbazido, isothiocyanato, thiobiuret, N-thioaminobiuret and N-thiocarbamoyl-polyalkylene polyamino group is directly or indirectly attached to the main chain.

All resins containing the aforementioned functional groups have excellent ability to adsorb heavy metals. Those containing at least one nitrogen-containing functional group selected from amino, hydrazide and polyalkylene polyamino groups have especially high speeds of adsorbing heavy metals, and after contacting them with a heavy metal containing solution, the concentration of the heavy metal remaining in the solution (this concentration will also be referred to simply as a flow-through value) is on the order of 0.01 p.p.m. when the heavy metal is mercury.

On the other hand, those containing at least one nitrogen- and sulfur-containing functional group selected from thioureido, thiosemicarbazido and N-thiocarbamoylpolyalkylene amino groups have a large absorption capacity for heavy metals, and have a flow-through value of less than 0.001 p.pm. for mercury, which means that the heavy metal is adsorbed and removed almost completely.

Accordingly, heavy metals can be efficiently and economically removed to low concentrations from a solution containing them by first bringing the solution into contact with a chelate resin containing at least one functional group selected from amino, hydrazido and polyalkyleneamino groups, and then with a resin containing at least one functional group selected from thiourea, thiosemicarbazide and N-thiocarbamoyl-polyalkylene amino groups.

The functional groups contained in the resin of this invention are expressed by the general formula as follows:

amino groups: —NHR
polyalkylene polyamino groups: —NH[CH$_2$CH$_2$NH]$_n$·R
hydrazido groups: —NHNHR
thioureido groups: —NHCSNHR
isothiocyanato group: —NCS
thiosemicarbazido groups: —NHNHCSNHR (or —NHCSNHNHR)
thiobiuret groups: —NHCSNHCONHR (or —NHCONHCSNHR)
N-thioaminobiuret groups: —NHNHCSNHCONHR (or —NHNHCONHCSNHR)
N-thiocarbamoyl-polyalkylene polyamino groups: —NH[CH$_2$CH$_2$NH]$_n$CSNHR In these formulae, R is a hydrogen atom, alkyl group, aryl group or acyl group, and $n$ is 1 to 100, preferably 1 to 5.

The number of the functional groups to be attached to the resin base is at least one per molecular of the base. Usually, the number is at least 1 per about 250, preferably 100, monomer units in order to provide suitable heavy metal adsorbing resins of this invention.

The functional group may be bonded to the carbon atom of the main chain of the polymer. When the polymer contains a pendant aliphatic or aromatic group, the functional group may be attached to the carbon atom of the pendant aliphatic or aromatic group.

The method of preparation of the resin of this invention is not particularly limited. Generally, according to the purpose of use of the resulting resin, the functional group is introduced into a granulated base polymer of high molecular weight of which the main chain consists of an aliphatic hydrocarbon skeleton. The size of the granules is 10 to 300 mesh, preferably 15 to 50 mesh.

Below are given some examples of reactions that can be suitably used for producing the heavy metal adsorbing resins of this invention.

(1) A hypohydrohalous acid salt is reacted in alkali with a high-molecular-weight polymer (to be referred to simply as a base polymer) of which the main chain consists of an aliphatic hydrocarbon skeleton and which contains a carbamoyl group (—CONH$_2$) introduced thereinto to produce a heavy metal-adsorbing resin of this invention containing an amino group (the so-called Hofmann degradation).

(2) A base polymer having a cyano group (—CN) or nitro group (—NO$_2$) introduced thereinto is reduced with a metal hydride or tin-hydrochloric acid thereby to form a heavy metal adsorbing resin of this invention containing an amino group.

(3) A base polymer containing a halogen atom either in itself or introduced thereinto is reacted with ammonia, hydrazine or a polyalkylene polyamine to produce a resin containing an amino group (—NH$_2$), hydrazido group (—NHNH$_2$) or polyalkylene polyamino group

[—NH(C$_2$H$_4$NH)$_n$H]

respectively. In this case, a vinyl chloride polymer or a copolymer or graft copolymer consisting mainly of vinyl chloride units can be suitably used.

(4) The above resin containing an amino, hydrazide or polyalkylene polyamino group either as such or after being converted to its hydrochloride, is reacted with a sulfur-containing compound selected from the group consisting of thiocyanic acid salts, thioureas, carbon disulfide, isothiocyanates and thiobiuret, etc. thereby to form a heavy metal adsorbing resin of this invention containing a thioureido, thiosemicarbazido, isothiocyanato, thiobiuret, N-thioaminobiuret or N-thiocarbamoyl-polyalkylene polyamino group. This reaction can be performed in the presence of a solvent which can dissolve the sulfur-containing compound, such as water or an alcohol, at room temperature to the reflux temperature. The amount of the sulfur-containing compound differs according to the number of amino, hydrazido, or polyalkylene polyamino groups attached to the substrate of the polymer. Generally, it is sufficient to use it in an amount of at least 0.1 in terms of the molar ratio of it as against the amount of the substrate. Specific examples of the sulfur-containing compounds are: the salts of thiocyanic acid such as the lithium, sodium, potassium, magnesium, calcium, strontium, barium or ammonium salt; the thioureas such as thiourea and its alkyl (such as methyl, ethyl or propyl), aryl (such as phenyl), acyl (such as acetyl or benzoyl), or carbamoyl substitution product; and the isothiocyanates such as alkyl (such as methyl, ethyl or propyl) derivatives of isothiocyanic acid or the phenyl or naphthyl derivative thereof.

(5) A heavy metal adsorbing resin containing an isothiocyanato group is prepared by going through the stage of a dithiocarbamic acid salt of the above polymer, or by causing thiophosgen to act on the aminated polymer.

(6) A polymer of vinyl chloride or vinylidene chloride or a halogenated polymerized type polymer is reacted with thiocyanic acid or thiocyanic acid salt to introduce an isocyanato group.

(7) The above isothiocyanato-containing polymer is reacted with a nitrogen-containing compound selected from ammonia, primary and secondary amines, hydrazines and polyamines to produce a heavy metal adsorbing resin containing a thioureido or thiosemicarbazido group. In this method, the isothiocyanato-containing polymer is reacted with the nitrogen-containing compound at room temperature to the reflux temperature in the presence of an inert solvent which dissolves the nitrogen-containing compound such as water, an alcohol or dimethyl formamide or using the nitrogen-containing compound itself as a solvent. Specific examples of the nitrogen-containing compound used in the above reaction are: the primary amines such as ethylamine or aniline; the secondary amines such as diethyl amine or dipropyl amine; the hydrazine derivatives such as phenyl hydrazine, or hydrazine; and the polyamines such as ethylene diamine, propylene diamine, diethylene-ditriamine, triethylene-tetramine or polyethylene imine. Hydrazine and ammonia are especially preferred. The amount of the nitrogen-containing compound used in the reaction may be determined according to the number of isothiocyanate groups attached to the polymer. Usually, it is at least 0.1, preferably at least 0.5, in terms of its molar ratio as against the isothiocyanate groups.

The heavy metal adsorbing resins of this invention are useful for removing and detecting heavy metals upon contact with solutions containing them. When it is desired to remove heavy metals effectively from a solution containing them using the heavy metal adsorbing resin of this invention, it is desirable that the pH of the solution be adjusted to 1–11, preferably 3–7, prior to contact with the resin. If the pH of the solution to be treated is less than 1, the amount of the heavy metals to be adsorbed by the resin is reduced. Furthermore, the amount of the heavy metals remaining in the solution after treatment increases, and discharging the solution as such is likely to cause environmental pollution. On the other hand, if the pH of the solution exceeds 9, the heavy metals are converted to their hydroxides, and as a result, the amount of the heavy metals to be adsorbed by the resin decreases.

The method of contacting the heavy metal containing solution with the heavy metal adsorbing resin of this invention is not particularly limited. In commercial practice, it is the practice to pass the solution through a fixed or fluidized bed in which the resin has been packed. Because of the extreme superiority of the resin of this invention in the ability to adsorb heavy metals, it is capable of continuously adsorbing and removing most of the heavy metals until it reaches saturation, even when a solution containing the heavy metals is treated in a fluidized bed. In addition, since the resin in the fluidized bed adsorbs the heavy metals while being suspended to attain an extremely increased specific gravity, and falls downwards, it is advantageous to employ the up-flow method by which the solution is passed from the bottom and withdrawn from the top.

Advantageously, a solution containing a heavy metal is first treated in a fluidized bed using the heavy metal adsorbing resin of this invention to remove most of the heavy metal by adsorption, and then treated in a fixed bed thereby to adsorb and remove the remaining heavy metal to an extremely low concentration. Since the solution treated in the fixed bed contains heavy metals of low concentrations as a result of adsorption in the fluidized bed, the remaining heavy metal can be easily adsorbed and removed. Furthermore, even if a large quantity of the solution is treated, the operation can be performed continuously for a prolonged period of time, because the absolute amount of the heavy metals adsorbed in the resin within the fixed bed is small.

Examples of the metals that can be adsorbed by the resins used in this invention are mercury, chromium, nickel, copper, molybdenum, cobalt, bismuth, manganese, lead, zinc, gold, silver and platinum. The heavy metal adsorbing resins of this invention especially have the highest ability to adsorb mercury, and is very effective for preventing pollution by mercury since it can adsorb and remove mercury from its solution to a very low concentration. Next in order, the heavy metal adsorbing resin of this invention has a great ability to adsorb gold, silver and platinum, and there can effectively recover these metals from the solutions.

After adsorption of heavy metals, the resin of this invention can be regenerated by simply contacting it with a mineral acid or sodium sulfide or sodium polysulfide to regain its adsorbing ability almost completely. This is surprising in view of the fact that the conventional condensation type chelate resins cannot be at all regenerated with a mineral acid, and the re-usability of the resin has a very great commercial value.

In order to illustrate the present invention further, the following Examples and Comparative Examples will be given. However, the present invention is not limited to these Examples.

Unless otherwise specified, the measurement of the concentrations of heavy metals in these Examples was performed by the following methods based on JIS K 0102. The concentration of copper was measured by the sodium diethylthiocarbamate method, the concentration of mercury by the flameless atomic absorption method, the concentration of chromium by the diphenyl carbazide method, the concentration of manganese by the potassium perhydroiodate method, the concentration of bismuth by the bismuth iodide method, and the concentrations of zinc and lead by the dithizone method. The concentrations of silver and platinum, of which measuring method is not described in JIS K 0102, were determined by the dithizone method and the iodoplatinic acid method respectively.

EXAMPLE 1

Hydrazine hydrate (100 cc.) was added to 30 g. of granules (about 40 mesh in size) of polyvinyl chloride, and the mixture was refluxed for 15 hours to form a red resin. Examination of this resin by infrared spectrum shows that an absorption band due to C—Cl disappeared, and there was an absorption band due to N—H and a slight absorption band due to C=C—H.

The resin obtained above was converted to its hydrochloride (the resin turned brown), and 20 g. of the resin was mixed with 35 g. of thiourea and 150 cc. of water. The mixture was refluxed for 12 hours to form an orange red resin. Infrared spectrum and elemental analysis showed that this resin contained a thiosemicarbazido group (—NHNHCSNH$_2$) and a hydrazido group (—NHNH$_2$).

The resin so obtained (11 cc.) was packed into a column having an inside diameter of about 1 cm., and a solution of mercury (pH 4.5) having a concentration of 200 p.p.m., which had been prepared from mercuric chloride, was caused to flow from the top of the column. The concentration of mercury in the solution flowing down from the bottom of the column (to be referred to as the flow-through value) was measured, and found to be less than 0.001 p.p.m.

The portion of the resin layer packed in the column which adsorbed mercury turned brown, and there was seen a clear boundary between this portion and the portion which did not adsorb the mercury. This boundary line moved towards the bottom of the column as the amount of the solution passing through the column increased. Accordingly, the suitable time for replacing or regenerating the resin could be easily detected from the change in the color of the resin layer.

The discolored portion of the resin layer mentioned above was taken out, and the amount of mercury adsorbed to it was measured. It was found that the amount of mercury per unit weight of the resin (to be simply referred to as the adsorption capacity) was 0.51 g. per gram of the wet resin. On the other hand, the amount of mercury adsorbed to the undiscolored portion of the resin was 0.0006 g. per gram of the wet resin. It is therefore seen

7 that the heavy metal adsorbing resin of this invention has an extremely high rate of adsorbing mercury, and the mercury adsorbed layer is formed orderly.

The volume of a mercury solution with a concentration of 20 p.p.m. which can be treated while maintaining the flow-through value at not more than 0.001 p.p.m. (to be referred to simply as a treating factor) was more than 16,000 cc. per cubic centimeter of the resin.

When the resin having adsorbed thereto 0.51 g. of mercury per gram of wet resin is regenerated by passing therethrough 6N-hydrochloric acid or 1N-sodium sulfide solution. The amount of mercury in the resin was reduced to 3 mg. per gram of wet resin, or to 5 mg. per gram of wet resin, respectively. This regenerated resin was thoroughly washed with water, and the mercury solution was treated in the same way as above. The adsorption capacity of mercury was again 0.5 g. per gram of wet resin.

EXAMPLE 2 (EXAMPLE OF USE)

The heavy metal adsorbing resin containing a thiosemicarbazido group produced in Example 1 was packed into a cylindrical packing column having a column diameter of 100 mm., and two-staged fluidized bed (the height of the column was 400 mm. in each stage) and one-staged fixed bed (the height of the column was 800 mm.) were arranged in series.

A mercury solution having a concentration of 200 p.p.m. was introduced into the above packing column at a flow velocity (LV) of 5 meters/hour from the bottom of the fluidized bed, and was passed therethrough while flowing the resin. The aqueous solution which flowed out from the top of the fluidized bed was caused to flow down from the top of the fixed bed. The mercury concentrations (flow-through value) of the solutions flowing out from the fluidized bed and from the fixed bed were less than 0.008 p.p.m. and 0.001 p.p.m. respectively.

After two-month operation the amount of the treated solution that passed reached about 9,000 times the amount (volume) of the resin in the fluidized bed and it was totally unnecessary to back-wash the resin in the fixed bed.

EXAMPLE 3

Granules of a polystyrene resin (about 25 mesh) were nitrated with a mixed acid, and then reduced with tin and hydrochloric acid to form an aminated polystyrene resin. Ten grams of the aminated polystyrene were mixed with a mixed solution of 27 g. of carbon disulfide and 50 cc. of concentrated aqueous ammonia, and the mixture was vigorously stirred at room temperature for 5 hours. The product was separated by filtration, and heated to 80° C. to form a black resin.

Infrared spectrum and elemental analysis showed that this resin contains a thiourea group (—NHCSNH$_2$).

An adsorption test on mercury was performed using the heavy metal adsorbing resin obtained above, in the same way as in Example 1. The portion of the resin which adsorbed mercury turned gray black, and there was seen a clear boundary between it and the portion which did not adsorb mercury.

The flow-through value of the resin was less than 0.001 p.p.m., and the treatment factor was more than 13,000. The adsorption capacity was 0.41 g. per gram of wet resin.

The resin was regenerated in the same way as in Example 1. When it was treated with 6N-hydrochloric acid, the amount of mercury adsorbed was reduced to 6 mg. per gram of wet resin, and when it was treated with 1N-sodium sulfide solution, the amount of mercury adsorbed decreased to 8 mg. per gram of wet resin.

The same adsorption test on mercury as above was performed using the regenerated resin. The flow-through value was 0.001 p.p.m., and the adsorption capacity was about 0.4 g. per gram of wet resin.

8

EXAMPLE 4

200 cc. of diethylene triamine and 150 cc. of water were added to 50 g. of granules (about 40 mesh in size) of polyvinyl chloride, and the mixture was refluxed for 12 hours to form a yellow red resin. Infrared spectrum of this product showed that an absorption band due to C—Cl disappeared and an absorption band due to N—H was observed.

Ten grams of this resin was added to a mixed solution of 27 g. of carbon disulfide and a solution of 15 g. of sodium hydroxide in 32 cc. of water, and the mixture was stirred for 3 hours at room temperature. Then, while adding 40 g. of ethyl chlorocarbonate dropwise, the mixture was continuously stirred for 2 hours. Infrared spectrum of the resulting resin showed that a strong band due to —N=C=S was observed.

Hydrazine hydrate (30 cc.) was added to 10 g. of the above resin. With some heating, the mixture was stirred for 2 hours to form an orange red resin. Infrared spectrum of this resin showed that it does not show an absorption band due to —N=C=S, and by the infrared spectrum and elemental analysis, the product was identified as containing a thiosemicarbazido group

(—NHCSNHNH$_2$)

Using the resulting heavy metal absorbing resin, an adsorption test on mercury was performed in the same way as in Example 1. The portion of the resin which adsorbed mercury turned brown, and was clearly distinguished from the portion which did not adsorb mercury. The flow-through value of the heavy metal adsorbing resin was less than 0.001 p.p.m., the treatment factor was 18,000, and the amount of mercury adsorbed was 0.52 g. per gram of wet resin.

The portion of the resin which adsorbed mercury was regenerated in the same way as in Example 1. When it was treated with 6N-hydrochloric acid, the amount of mercury adsorbed was 4 mg. per gram of wet resin. An adsorption test on mercury was performed in the same way as above using the regenerated resin. The amount of mercury adsorbed was about 0.5 g. per gram of wet resin.

EXAMPLE 5 (EXAMPLE OF USE)

100 cc. of the heavy metal adsorbing resin produced in Example 1 was packed in a column, and each of a silver solution having a concentration of 200 p.p.m., a gold solution with a concentration of 20 p.p.m. and a platinum solution with a concentration of 20 p.p.m. prepared respectively from silver nitrate, chloroauric acid and chloroplatinic acid was passed through the column in the same way as in Example 1.

The flow-through value of the resin for silver was less than 0.1 p.p.m., the treatment factor was 400, and the adsorption capacity was 0.15 g. per gram of wet resin. In the case of gold, the flow-through value was less than 0.5 p.p.m., the treatment factor was 600, and the adsorption capacity was 0.2 g. per gram of wet resin. In the case of platinum, the flow-through value was less than 0.5 p.p.m., the treatment factor was 450, and the adsorption capacity was 0.15 g. per gram of wet resin.

EXAMPLE 6

Each of the resin bases indicated in Table 1 was reacted with each of the reactants shown in Table 1 to form a heavy metal adsorbing resin containing the various functional groups indicated. Referring to Table 1, when aminated polystyrene was used as the base polymer (Runs Nos. 1, 2 and 9), the reaction was performed in accordance with the method of Example 3. When the other base polymers were used, the reaction was performed in accordance with Example 1.

Using each of the resulting resins, an adsorption test on mercury was performed in the same way as in Example 1. The results are shown in Table 1.

TABLE 1

| Run Nos. | Base polymers | Reactants | Functional group | Flow-through value (p.p.m.) | Treatment factor | Adsorption capacity (g. of Hg/g. of wet resin) |
|---|---|---|---|---|---|---|
| 1 | Aminated polystryene | Phenyl isothiocyanate | —HNCSNHph | 0.005 | 100,000 | 0.33 |
| 2 | do | N-ethylthiourea | —NHCSNHEt | 0.005 | 10,000 | 0.31 |
| 3 | An isocyanated reaction product between chlorinated polypropylene and ammonia. | Hydrazine | —NHCSNHNH$_2$ | <0.001 | 11,000 | 0.38 |
| 4 | A reaction product between polyvinyl chloride and hydrazine. | Thiobiuret | —NHNHCSNHCONH$_2$ | <0.001 | 14,000 | 0.45 |
| 5 | A reaction product between chlorinated polyethylene and hydrazine. | Acetylthiourea | —NHNHCSNHCOCH$_3$ | 0.003 | 10,000 | 0.30 |
| 6 | A reaction product between vx/vdc copolymer and ammonia. | Ethyl isocyanate | —NHCSNHEt | 0.005 | 8,000 | 0.25 |
| 7 | A reaction product between vc/pr copolymer and hydrazine. | Ammonium thiocyanate | —NHNHCSNH$_2$ | <0.001 | 15,000 | 0.49 |
| 8 | A reaction product between polyvinyl chloride and hydrazine. | N-phenylthiourea | —NHNHCSNHph | 0.004 | 12,000 | 0.37 |
| 9 | Aminated polystyrene. | Thiobiuret | —NHCSNHCONH$_2$ | <0.001 | 12,000 | 0.38 |
| 10 | A reaction product between vc/pr copolymer and hydrazine. | N-ethylthiourea | —NHNHCSNHEt | 0.005 | 9,000 | 0.30 |
| 11 | A reaction product between chlorinated polyethylene and ethylene diamine. | Acetyl thiourea | —NHCSNHCOCH$_3$ | 0.004 | 10,000 | 0.30 |
| 12 | A reaction product between polyvinyl chloride/polypropylene oxide (2%) graft copolymer and hydrazine. | Thiourea | —NHNHCSNH$_2$ | <0.001 | 15,000 | 0.45 |

NOTE.—In Table 1, the vc/vdc copolymer is a copolymer consisting of 30% of vinyl chloride and 70% of vinylidene chloride, the vc/pr copolymer is a copolymer consisting of 97% of vinyl chloride and 3% of propylene, ph stands for —C$_6$H$_5$, and Et stands for —C$_2$H$_5$.

EXAMPLE 7

200 cc. of diethylene triamine and 150 cc. of water were added to 50 g. of granules (about 40 mesh in size) of polyvinyl chloride, and the mixture was refluxed for 12 hours to form a yellow red resin product. Infrared spectrum of the product did not show an absorption band due to C—Cl, but showed a strong absorption of N—H.

41 grams of ammonium thiocyanate and 200 cc. of water were added to 29 g. of the hydrochloride of the above resin, and the mixture was heated for 2.5 hours to form a red brown resin product. The ability of the resulting resin to adsorb mercury was measured in the same way as in Example 1. The flow-through value was less than 0.001 p.p.m. The treatment factor at this flow-through value was more than 16,000 for a mercury solution with a concentration of 20 p.p.m.

The portion of the resin which adsorbed the mercury turned gray brown, and was clearly distinguished from the portion which did not adsorb mercury. The amount of mercury adsorbed to the discolored portion of the resin was 0.50 g. per gram of wet resin.

Furthermore, the portion of the resin which adsorbed mercury was regenerated using 6N-hydrochloric acid or 1N-sodium sulfide solution. The amount of mercury adsorbed to the resin was reduced to 4-8 mg. per gram of wet resins. Using the regenerated resin, the amount of mercury adsorbed was again measured, and found to be 0.5 g. per gram of wet resin.

EXAMPLE 8

Each of the base polymers shown in Table 2 was reacted with each of the reactants indicated in Table 2 by the same method as in the previous Example to form various heavy metal adsorbing resins.

The ability of each of the resulting resins to adsorb mercury was measured in the same way as in Example 1. The results are shown in Table 2.

The resins based on the aminated polystyrene resin were generally black, and turned gray black on adsorption of mercury. On the other hand, those based on the vinyl chloride resin were generally yellow to red, and turned brown to light brown on adsorption of mercury. In both cases, the resins which adsorbed mercury could be clearly distinguished from those which did not.

EXAMPLE 9

Granules of polyvinyl chloride were reacted with triethylene tetramine in the same way as in Example 7, and then with thiourea to form a yellow red resin product.

The resulting heavy metal adsorbing resin was contacted with a solution containing chromium in a concentration of 200 p.p.m. which was produced from potassium chromate. The flow-through value was about 0.1 p.p.m. Similarly, the flow-through value was 0.1 p.p.m. for copper, 2 p.p.m. for manganese and less than 5 p.p.m. for bismuth. The resin which adsorbed the above heavy metals turned light brown.

EXAMPLE 10

100 cc. of hydrated hydrazine was added to 30 g. of granules (about 50 mesh) of polyvinyl chloride, and the mixture was refluxed for 15 hours to form a red resin product. Infrared spectrum and elemental analysis showed that this product contained a hydrazino group.

The ability of the above resin to adsorb mercury was measured in the same way as in Example 1. The flow-through value was 0.02 p.p.m., and the treatment factor was more than 20,000.

The portion of the resin which adsorbed mercury turned brown, and was clearly distinguished from the portion which did not adsorb mercury (red).

The amount of mercury adsorbed to the portion of the resin which turned brown was 0.60 g. per gram of wet resin, and the amount of mercury adsorbed to the undiscolored portion of the resin at the bottom of the packing column was only 0.01 g. per gram of wet resin.

The resin which was discolored upon adsorption of mercury was regenerated by passing 6N-hydrochloric acid

TABLE 2

| Run Nos. | Base polymers | Reactants (S-containing compound) | Flow-through value (p.p.m.) | Treatment factor | Adsorption capacity (g. of Hg per gram of wet resin) |
|---|---|---|---|---|---|
| 1 | Aminomethylated polystyrene | N-ethylthiourea | 0.005 | 10,000 | 0.31 |
| 2 | Reaction product between chlorinated polypropylene and ethylene diamine | Potassium thiocyanate | 0.002 | 10,000 | 0.32 |
| 3 | Reaction product between aminated polystyrene and polyethylene imine | Thiourea | 0.002 | 11,000 | 0.36 |
| 4 | Reaction product between polyvinyl chloride and hydrazine | Thiobiuret | <0.001 | 14,000 | 0.45 |
| 5 | Reaction product between polyvinyl chloride and piperazine | Calcium thiocyanate | 0.005 | 7,000 | 0.22 |
| 6 | Reaction product between chlorinated polyethylene and hydrazine | Acetyl thiourea | 0.003 | 10,000 | 0.30 | or 1N-sodium sulfide solution. In either case, the amount of mercury in the resin decreased to about 10 mg. per gram of wet resin. Using the regenerated resin, the same mercury adsorption test as above was performed. It was found that the adsorption capacity again showed about 0.60 g. per gram of wet resin.

EXAMPLE 11

The mercury adsorbing ability of each of the resins shown in Table 3 containing the various functional groups shown in Table 3 was tested in the same way as in Example 1. The results are shown in Table 3.

When the regenerated resin was well washed with water and then contacted with the mercury solution in the same manner as above described, the amount of mercury adsorbed again showed 0.5 g. per gram of wet resin.

EXAMPLE 14

Polystyrene resin granules (about 25 mesh in size) were nitrated using a mixed acid, and then reduced with tin and hydrochloric acid to form aminated polystyrene.

TABLE 3

| Base polymers | Functional group | Flow-through value (p.p.m.) | Treatment factor | Adsorption capacity (g) of Hg./g. of wet resin |
|---|---|---|---|---|
| Aminated polystyrene | Amino group | 0.04 | 18,000 | 0.57 |
| Reaction product between polyvinyl chloride and diethylene triamine | do | 0.02 | 18,000 | 0.58 |
| Reaction product between chlorinated polypropylene and hydrazine | Hydrazine group | 0.02 | 16,000 | 0.52 |
| Reaction product between a vinyl chloride/propylene copolymer and triethylene tetramine | Amino group | 0.03 | 15,000 | 0.50 |

EXAMPLE 12 (EXAMPLE OF USE)

A solution containing copper in a concentration of 200 p.p.m. which was prepared from copper sulfate was passed through the reaction product between a vinyl chloride/propylene copolymer and triethylene tetramine obtained in Example 11. The flow-through value for copper was about 1 p.p.m.

The same adsorption test showed that the flow-through value for nickel, cobalt and zinc was less than 10 p.p.m.

EXAMPLE 13

The isothiocyanato-containing resin obtained in Example 4 from polyvinyl chloride granules was immersed in ethanol instead of the hydrazine hydrate used in Example 4, and with some heating, ammonia gas was blown thereinto with stirring. After 30 minutes, a red brown resin was obtained.

The ability of the resulting resin to adsorb mercury was measured in the same way as in Example 1. The flow-through value was less than 0.001 p.p.m.

The treatment factor of the mercury solution which could be treated while the flow-through value of the resin was maintained at less than 0.001 p.p.m. was more than 16,000 cc.

The portion of the resin which adsorbed mercury turned gray brown, and could be clearly distinguished from the portion which did not adsorb mercury. The amount of mercury adsorbed was 0.51 g. per gram of wet resin. The amount of mercury adsorbed to the undiscolored portion of the resin was only 0.004 g. per gram of wet resin.

The resin which adsorbed mercury was regenerated by passing 6N-hydrochloric acid and 1N-sodium sulfide solution. As a result, the amount of mercury in the resin was reduced to 4-8 mg./g. of wet resin in either case.

Then, in the same way as in Example 13 the aminated polystyrene was reacted with a mixed solution of carbon disulfide and sodium hydroxide. Then, the reaction was performed adding ethyl chloro carbonate. The product was treated with ethanolic ammonia to form a black resin.

The ability of the resulting resin to adsorb mercury was measured in the same way as in Example 1. The flow-through value was less than 0.001 p.p.m., and the treatment factor at this flow-through value was more than 13,000 cc. for the mercury solution having a concentration of 20 p.p.m.

The resin which adsorbed mercury turned gray black, and could be clearly distinguished from the portion which did not adsorb mercury.

The portion of the resin which discolored upon adsorption of mercury was regenerated using 6N-hydrochloric acid and 1N-sodium sulfide solution. In either case, the amount of mercury adsorbed to the resin was reduced to about 8 mg. per gram of wet resin. When the regenerated resin was contacted with the mercury solution, the amount of mercury adsorbed to the resin almost returned to the original value.

EXAMPLE 15

Each of the base polymers shown in Table 4 was reacted with a mixed solution of carbon disulfide and sodium hydroxide, and the reaction was continued while adding ethyl chlorocarbonate to form an isothiocyanato-containing resin.

Each of the resulting resins was reacted with each of the reagents shown in Table 4 to form a heavy metal adsorbing resin of this invention. The ability of each of these resins to adsorb mercury was measured in the same way as in Example 1. The results are shown in Table 4.

TABLE 4

| Base polymers | Reactants (N-containing compounds) | Flow-through value (p.p.m.) | Treatment factor | Adsorption capacity (g. of Hg/g. of wet resin) |
|---|---|---|---|---|
| Reaction product between chlorinated polypropylene and ammonia | Hydrazine | <0.001 | 11,000 | 0.38 |
| Reaction product between polyvinyl chloride and triethylene tetramine | Ethylamine | 0.005 | 9,000 | 0.27 |
| Aminated polystyrene | Aniline | 0.005 | 10,000 | 0.33 |
| Reaction product between polyvinyl chloride and ethylene diamine | Polyethylene imine | 0.002 | 10,000 | 0.31 |
| Reaction product between ammonia and a copolymer of vinyl chloride (30%) and vinylidene chloride | Ammonia | <0.001 | 12,000 | 0.40 |
| Aminated polystyrene | Phenyl hydrazine | 0.004 | 12,000 | 0.40 |
| Reaction product between chlorinated polypropylene and ethylene diamine | Acetyl thiourea | 0.004 | 10,000 | 0.30 |
| Reaction product between hydrazine and a copolymer of vinyl chloride/propylene (3%) | Ammonia | <0.001 | 15,000 | 0.49 |
| Aminated polystyrene | Diethyl amine | 0.008 | 7,000 | 0.22 |

In the above table, the resins based on the aminated polystyrene were generally black, and turned gray black on adsorption of mercury. On the other hand, those which were based on the vinyl chloride resin were generally yellow to red, and turned brown to light brown on adsorption of mercury. In either case, the change in color was very distinct.

EXAMPLE 16 (EXAMPLE OF USE)

The heavy metal adsorbing resin obtained in Example 4 was packed into a column in the same way as in Example 1, and a chromium solution containing chromium in a concentration of 200 p.p.m. which was prepared from potassium chromate was passed through the column. The flow-through value of the resin was less than 0.1 p.p.m.

The same test was conducted on copper, manganese and bismuth and it was found that the flow-through value was 0.1 p.p.m. for copper, 2 p.p.m. for manganese and less than 5 p.p.m. for bismuth.

When the heavy metal adsorbing resins obtained in Examples 15 and 16 were used, similar results to those shown above were obtained.

EXAMPLE 17 (EXAMPLE OF USE)

Five grams each of the resin obtained in Example 1 was added to a solution containing mercury in a concentration of 1000 p.p.m. which had been prepared from mercuric chloride ($HgCl_2$) and then adjusted to the desired pH value using a buffer solution. Each of the mixtures obtained was stirred for 4 hours.

The concentration of mercury remaining in the solution was analyzed. The results are shown in Table 5 below.

TABLE 5

| pH of the mercury solution: | Concentration of remaining mercury (p.p.m.) |
|---|---|
| 1 | 2.0 |
| 2 | 23 |
| 4 | 4.0 |
| 5 | 3.0 |
| 7 | 4.6 |
| 8 | 9.5 |

EXAMPLE 18 (EXAMPLE OF USE)

Two packing columns having a column diameter of 100 mm. were used. In one (first column) of them, the hydrazino-containing adsorbing resin obtained in Example 10 was packed, and in the other (second column), the thiosemicarbazido-containing adsorbing resin obtained in Example 1 was packed. The first and second columns were joined with a pipe, and a mercury solution containing mercury in a concentration of 20 p.p.m. and adjusted to a pH 4–5 was introduced from the top of the first column. The solution which flowed out from the bottom of the first column was led to the top of the second column, and finally withdrawn from the bottom of the second column.

The amounts of mercury contained in the solution withdrawn from the bottoms of the first and second columns were less than 0.02 p.p.m. and 0.001 p.p.m., respectively.

COMPARATIVE EXAMPLE 1

The ability of the commercially available condensation type chelate resin comprising resorcinol-formaldehyde-thiourea (MA Resin, product of Hokuetsu Carbon Co. Ltd.) to adsorb mercury was measured in the same way as in Example 1. The adsorption capacity was 0.11 g. per gram of wet resin. The flow-through value was 0.001 p.p.m., and the treatment factor of a mercury solution containing mercury in a concentration of 20 p.p.m. was only 1,500 cc. at this flow-through value. The change in color of the resin by adsorption of mercury was not distinct.

What we claim is:

1. A heavy metal adsorbing resin consisting essentially of a polymer comprising:
  A. a backbone polymer selected from at least one of polystyrene, polyvinyl chloride, a copolymer of vinyl chloride with another copolymerizable monomer, a graft copolymer of a rubbery substance to which vinyl chloride has been grafted, and a chlorinated polyolefin; and
  B. a moiety attached to the backbone polymer which is selected from at least one thiosemicarbazide of the group consisting of —NHNHCSNHR and —NHCSNHNHR, wherein R is a hydrogen atom, alkyl moiety, aryl moiety, or acyl moiety.

2. The resin of claim 1 wherein said polymer contains at least one said functional group per about 250 monomer units.

References Cited

UNITED STATES PATENTS

| | | |
|---|---|---|
| 2,890,180 | 6/1959 | Cerny et al. |
| 3,196,107 | 7/1965 | Tomic. |
| 3,687,908 | 8/1972 | Picklesimer. |

OTHER REFERENCES

Campbell et al.: *Am. Chem. Soc., Div. Polymer Chem., Preprints 2*, No. 2, 270–80 (1961).

MELVIN GOLDSTEIN, Primary Examiner

U.S. Cl. X.R.

210—24; 260—79.5 NV; 423—22, 24, 49, 54, 87, 100